United States Patent [19]

Popov et al.

[11] 4,216,397
[45] Aug. 5, 1980

[54] LINEAR INDUCTION MOTOR

[76] Inventors: Alexandr D. Popov, pereulok Rynochny, 44; Vladimir A. Solomin, ulitsa Dachnaya, 14, kv. 31; Sergei S. Khantimirov, pereulok Boevoi, 4; Alexandr A. Shirikov, ulitsa Petrashevskogo, 48, kv. 23, all of, Rostov-na-Donu, U.S.S.R.

[21] Appl. No.: 962,782

[22] Filed: Nov. 21, 1978

[30] Foreign Application Priority Data

Mar. 20, 1978 [SU] U.S.S.R. .............................. 2591263

[51] Int. Cl.² ........................................... H02K 41/02
[52] U.S. Cl. ..................................................... 310/13
[58] Field of Search ................................... 310/12–14; 318/135; 104/148 LM

[56] References Cited
U.S. PATENT DOCUMENTS

| Re. 28,161 | 9/1974 | Bolton et al. | 310/13 |
|---|---|---|---|
| 3,497,730 | 2/1970 | Doolittle | 310/13 |
| 3,628,072 | 12/1971 | Nicholson | 310/13 |
| 3,644,762 | 2/1972 | Eastham | 310/13 |
| 3,761,747 | 9/1973 | Allaigre | 310/13 |
| 3,770,995 | 11/1973 | Eastham et al. | 310/13 |
| 3,836,799 | 9/1974 | Eastham et al. | 310/13 |

*Primary Examiner*—Donovan F. Duggan
*Attorney, Agent, or Firm*—Steinberg & Blake

[57] ABSTRACT

A linear induction motor comprises an inductor, which has a magnetic circuit comprised of first and second groups of laminated cores and also has a multiphase concentrated winding, and a secondary element having an electrically conductive member disposed on a magnetically conductive base. The laminated cores of the first group are arranged in a perpendicular relation to the direction of movement of the inductor and are connected one to another with the help of the laminated cores of the second group which are positioned along the direction of movement of the inductor.

1 Claim, 1 Drawing Figure

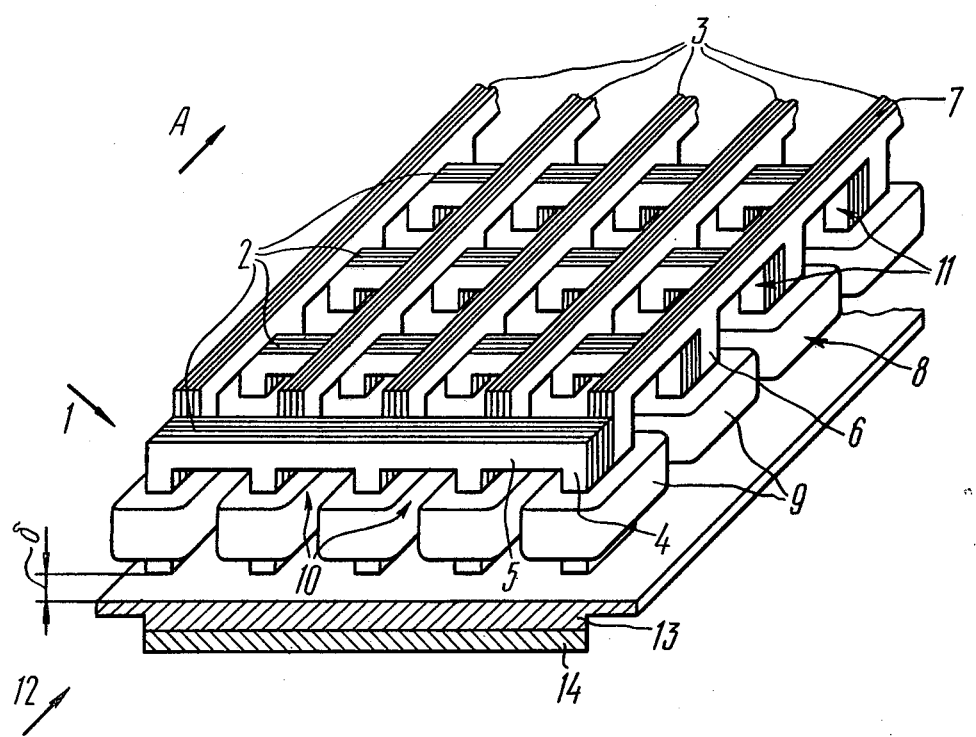

LINEAR INDUCTION MOTOR

BACKGROUND OF THE INVENTION

The invention relates to electrical machines, and more particularly to linear induction motors.

The motor of the invention can find use, for example, to proper high speed ground transportation vehicles. It can also find use wherever a rectilinear or reciprocating movement of the working members is required such as, for example, used in conveyors, electric drives and the like.

DESCRIPTION OF THE PRIOR ART

Known in the art is a linear induction motor (cf. French Pat. No. 2,062,622 cl.HO2K, 1971) comprising an inductor having a magnetic circuit comprised of individual laminated cores located transversely, and having a multiphase concentrated winding, said motor also comprises a secondary element disposed with the air gap $\delta$ relative to the inductor and provided with an electrically conductive member located on a magnetically conductive base.

The known motor exerts low tractive force and has low efficiency.

Known in the art is another linear induction motor (cf. an article by A. D. Popov and V. A. Solomin entitled "Construction Features of Linear Induction Motors with Transverse Closing of Magnetic Flux" and deposited in the Central Scientific Research Institute for Techno-economic Investigations of the Ministry of Means of Communication of the USSR, record no. 663/78) which motor comprises an inductor with a magnetic circuit including a first group of laminated cores and a second group of laminated cores, and with a multiphase concentrated winding whose coils are arranged in rows, and also comprises a secondary element with respect to which the inductor is displaced, the secondary element having an electrically conductive base located on a magnetically conductictive base. In addition, the secondary element is disposed with the air gap $\delta$ with respect to the inductor and each of the laminated cores includes a plurality of legs connected by means of a yoke.

The laminated cores of the first group have an inverted U-shape, are positioned at right angles to the direction of movement of the inductor and are interconnected by the laminated cores of the second group each having m slots and located in the direction of movement of the inductor.

The known motor provides low tractive force and has low efficiency.

SUMMARY OF THE INVENTION

An object of the invention is to provide a linear induction motor offering a higher tractive force.

Another object of the invention is to provide a linear induction motor offering a higher efficiency.

There is provided a linear induction motor comprising an inductor having a magnetic circuit comprised of a first group of laminated cores arranged in a perpendicular relation to the direction of movement of the inductor and connected one to another by means of laminated cores of a second group arranged along the direction of movement of the inductor, each of the laminated cores of either group having a plurality of legs interconnected by a yoke, and comprised of a multiphase concentrated winding whose coils are arranged in rows, which motor also comprises a secondary element provided with an electrically conductive member disposed on a magnetically conductive base, the inductor being displaced relative to the secondary element, there are provided, according to the invention, n slots in each of the laminated cores of the first group, the laminated cores of the first group having heights that are less than the heights of the laminated cores of the second group by the height of the yoke of any of the laminated cores of the second group, one of the endmost laminated cores of the first group having its legs maintained in an abutting relation to all of the endmost legs of the laminated cores of the second group, which are juxtaposed to these legs, the legs of the remaining laminated cores of the first group being disposed in slots of the laminated cores of the second group and being maintained in an abutting relation to corresponding legs of the laminated cores of the second group, each of the coils of the multiphase concentrated winding being adapted to encompass only one of the legs of a respective one of the laminated cores of the first group and only one of the legs of a respective one of the laminated cores of the second group.

The present invention provides for an increased freight capacity of high speed ground transportation vehicles; for example, high speed trains provided with the new motor of the invention can carry a heavier freight, while a higher efficiency of the motor results in a decrease in its maintenance cost.

DESCRIPTION OF THE DRAWINGS

The invention will now be described, by way of example, with reference to the accompanying drawing which shows a diagrammatic representation of a construction of a linear induction motor, according to the invention.

DESCRIPTION OF THE INVENTION

Referring to the accompanying drawing, the linear induction motor of the invention comprises an inductor 1 having a magnetic circuit which includes a first group of laminated cores 2 and a second group of laminated cores 3. The laminated cores 2 of the first group comprise a plurality of legs 4 interconnected by a yoke 5. The laminated cores 3 of the second group comprise a plurality of legs 6 interconnected by a yoke 7. The inductor 1 also comprises a multiphase concentrated winding 8 whose coils 9 are arranged in rows. The arrow A shows a direction in which the inductor 1 is moved. The laminated cores 2 of the first group are positioned in a direction perpendicular to the direction of movement of the inductor 1 and are connected one to another by means of the laminated cores 3 of the second group, positioned in the direction of movement of the inductor 1. According to the invention, each of the laminated cores 2 of the first group has n slots 10, namely, four such slots in the given embodiment. Each of the laminated cores 3 of the second group has m slots 11, the laminated cores 2 of the first group having heights that are less than the heights of the laminated cores 3 by the height of the yoke 7 of any of the laminated cores 3. One of the endmost laminated cores 2 has its legs 4 maintained in an abutting relation to all of the endmost legs 6 of the laminated cores 3 which are juxtaposed to these legs 4, whereas the remaining laminated cores 2 are disposed within the slots 11 of the laminated cores 3 and meet corresponding legs 6 of the latter. Each of the coils 9 of the multiphase concentrated winding 8 is adapted to encompass only one of the legs 4 of a respective one of the laminated cores 2 and only one of the legs 6 of a respective one of the laminated cores 3. The motor of the invention also comprises a secondary element 12 with respect to which the inductor 1 is moved. The secondary element 12 has an electrically conductive member 13 disposed on a magnetically conductive base 14.

The linear induction motor of the present invention operates in the following manner. At the moment when the multiphase concentrated winding 8 is connected to a three-phase power supply a travelling magnetic field is produced which tends to propagate in a direction opposite to the direction indicated by the arrow A. That travelling magnetic field intersects the electrically conductive member 13 to induce electromotive forces therein. As a result, eddy currents begin to flow through the electrically conductive member 13 and to interact with the travelling magnetic field. This interaction tends to produce a tractive force of the motor responsible for a displacement of the inductor 1 in the direction indicated by the arrow A. Due to the design features of the laminated cores 2 an even distribution of the magnetizing force in the air gap is attained with the result that the tractive force and efficiency of the motor are increased.

What is claimed is:

1. A linear induction motor comprising:
   an inductor;
   a magnetic circuit of said inductor;
   said magnetic circuit including laminated cores of a first group, positioned in a perpendicular relation to the direction of movement of said inductor, each of said laminated cores of said first group having a yoke, a plurality of legs interconnected by said yoke, and n slots;
   said magnetic circuit including laminated cores of a second group, positioned along the direction of movement of said inductor, each of said laminated cores of said second group having a yoke, a plurality of legs interconnected by said yoke, and a plurality of slots;
   said laminated cores of said first group, interconnected by said laminated cores of said second group;
   said laminated cores of said first group having heights that are less than the heights of said laminated cores of said second group by at least the height of the yoke of any of the laminated core of the second group;
   one of the endmost ones of said laminated cores of said first group having its legs maintained in an abutting relation to all of the endmost legs of the laminated cores of the second group, which are juxtaposed to these legs, the legs of the remaining laminated cores of the first group being disposed in the slots of the laminated cores of the second group and being maintained in an abutting relation to corresponding legs of the laminated cores of said second group;
   a multiphase concentrated winding of said inductor;
   coils of said multiphase concentrated winding, positioned in rows, each of said coils being adapted to encompass only one leg of the legs of a respective laminated core of said second group and only one of the legs of a respective laminated core of the second group;
   a secondary element with respect to which said inductor is displaced;
   a magnetically conductive base of said secondary element;
   an electrically conductive member of said secondary element, disposed on said magnetically conductive base.

* * * * *